Nov. 9, 1965  F. P. HOPFELD  3,216,599
LIFT TRUCK WITH A DETACHABLE MAST ASSEMBLY, AND
A PROPELLING AND ELEVATING CONTROL SYSTEM
Filed Oct. 15, 1962  6 Sheets-Sheet 1
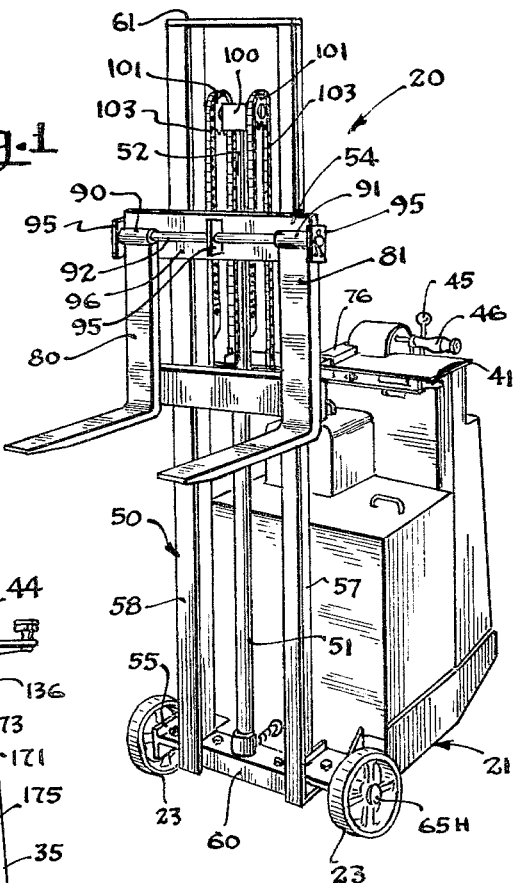
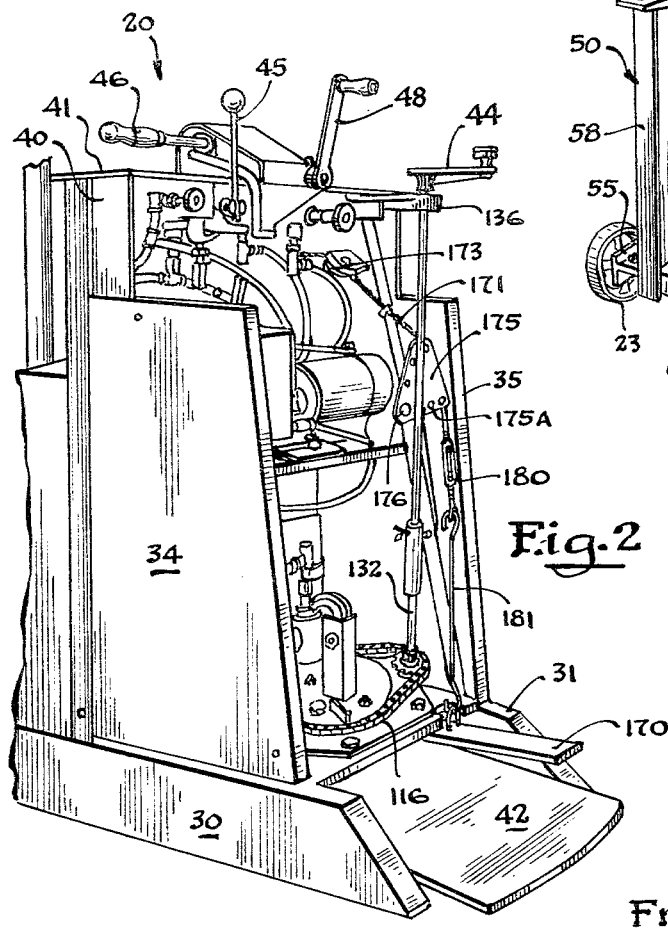
Inventor
Fred P. Hopfeld
By Wallace, Kinzer and Dorn
Attorneys

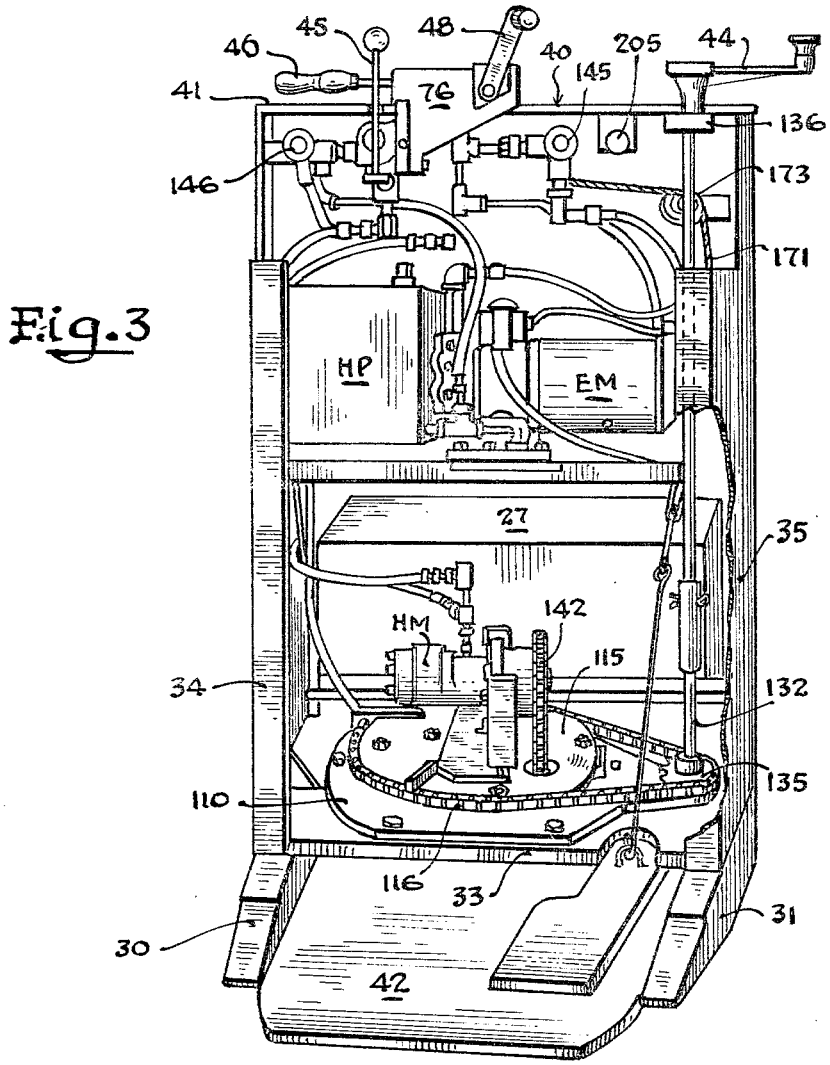

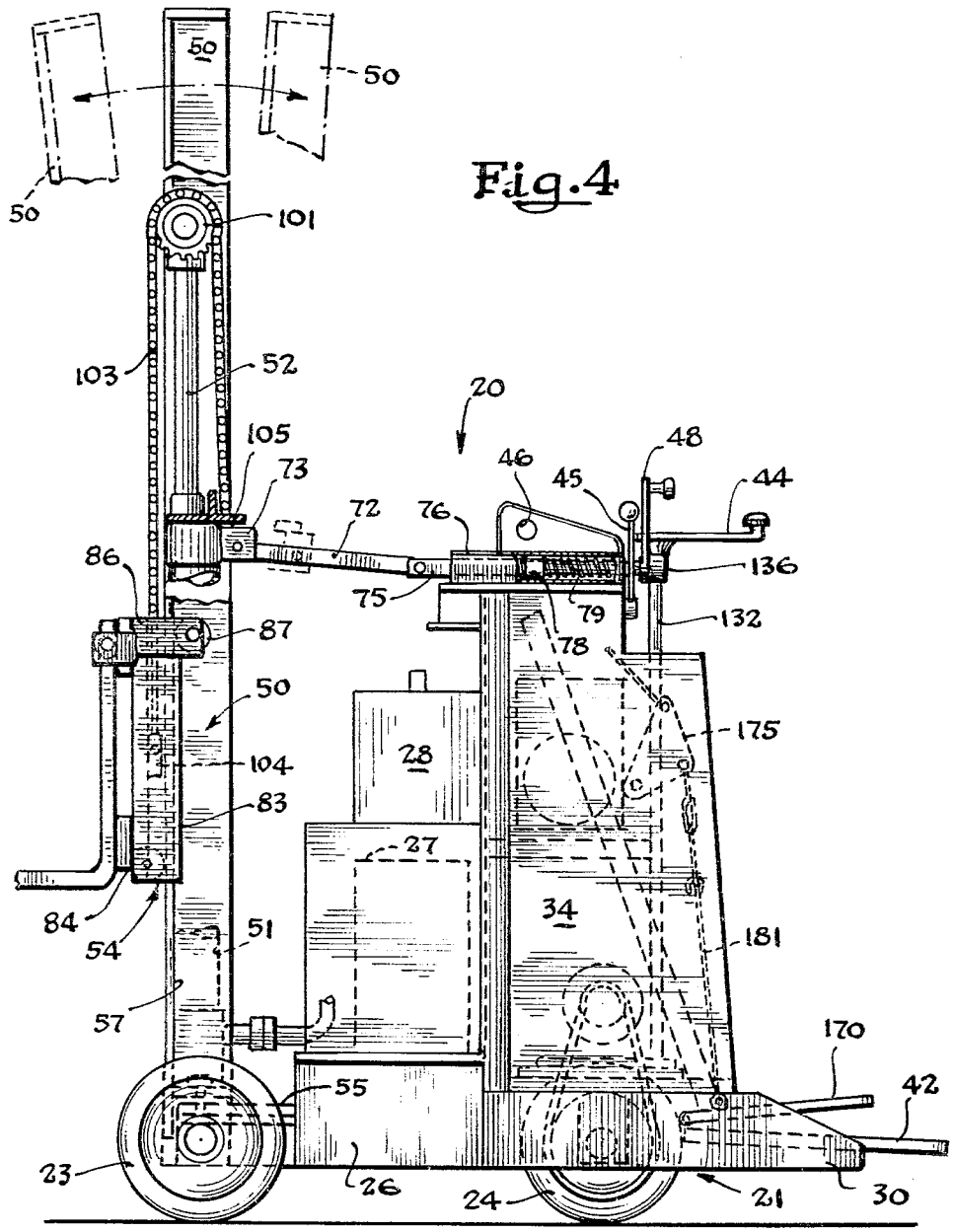

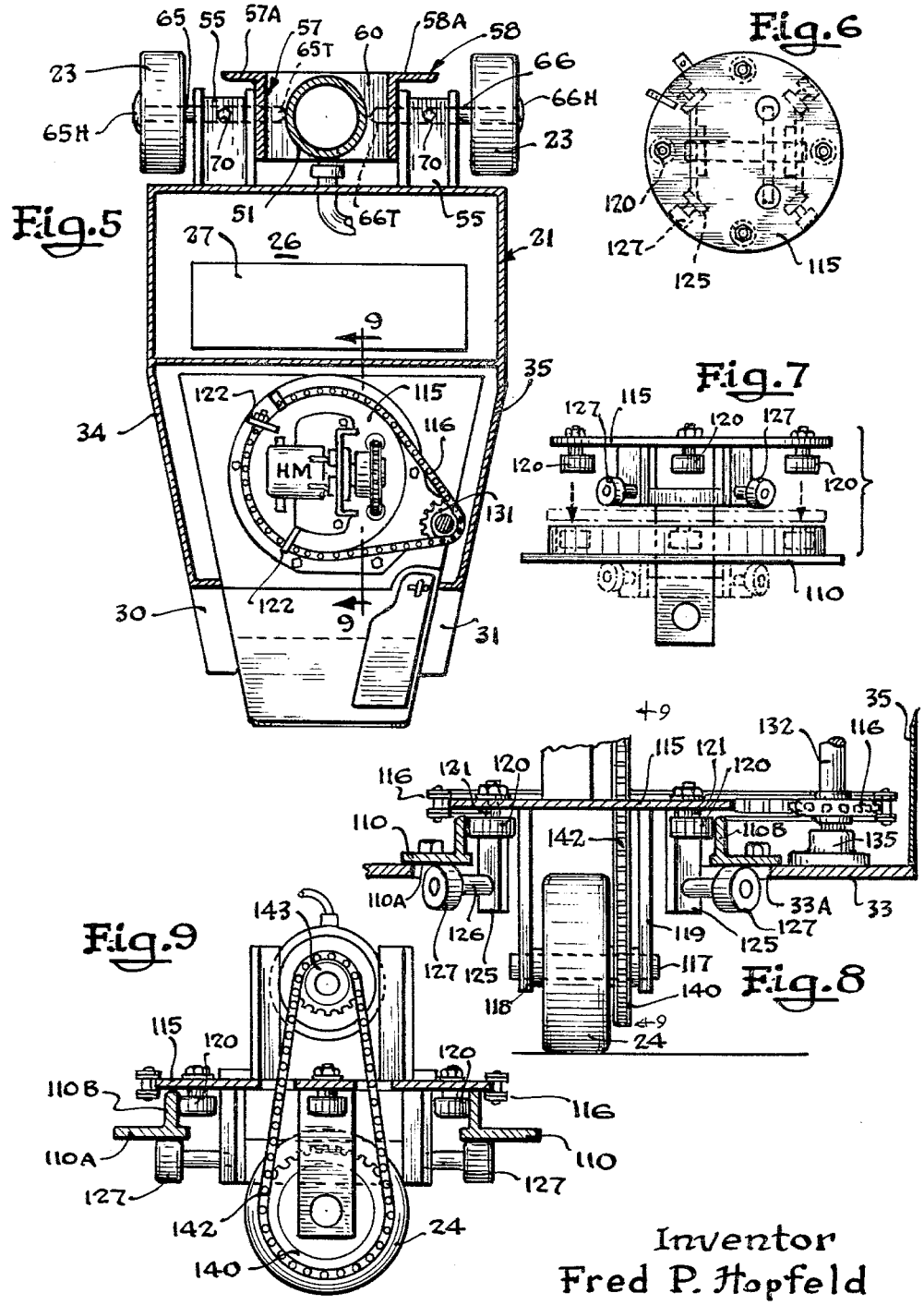

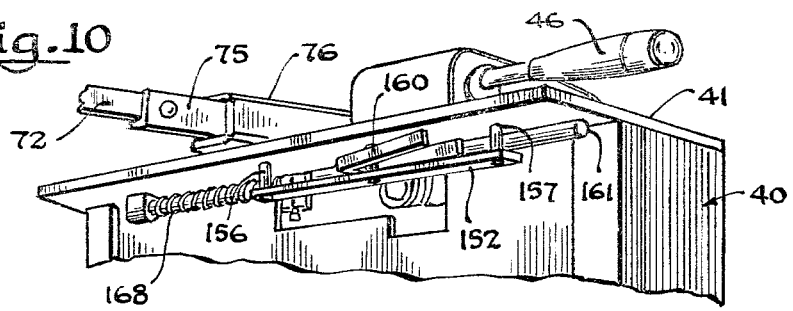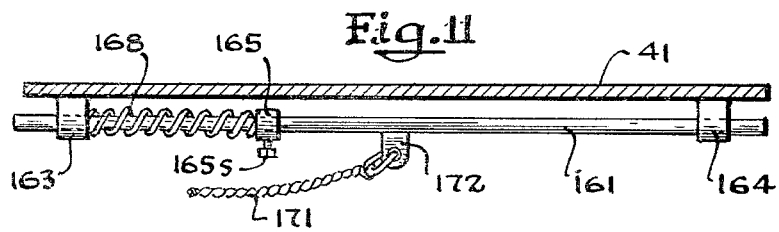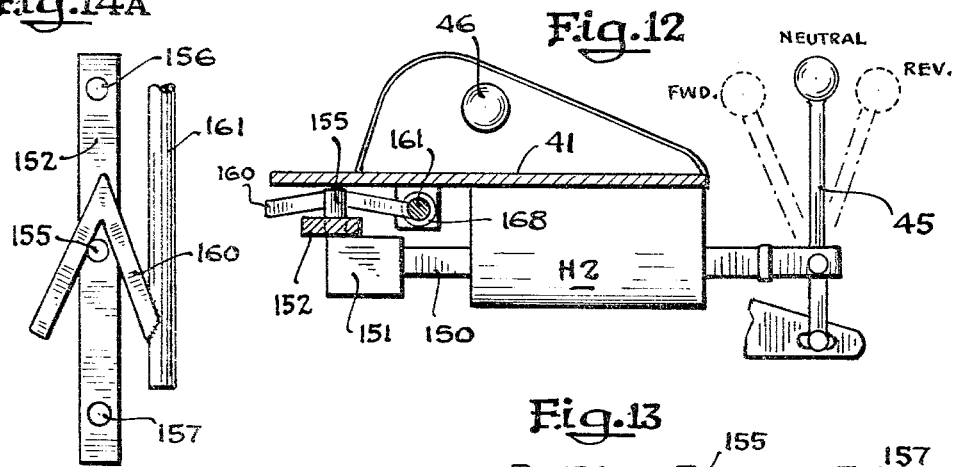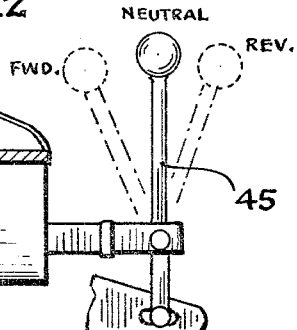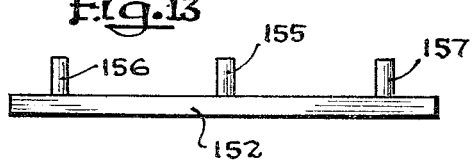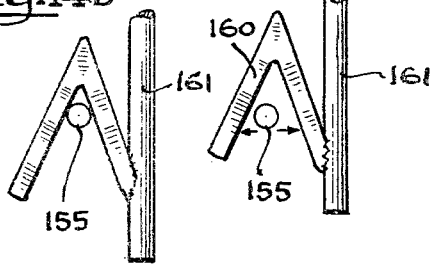

Nov. 9, 1965       F. P. HOPFELD                          3,216,599
         LIFT TRUCK WITH A DETACHABLE MAST ASSEMBLY, AND
            A PROPELLING AND ELEVATING CONTROL SYSTEM
Filed Oct. 15, 1962                              6 Sheets-Sheet 6
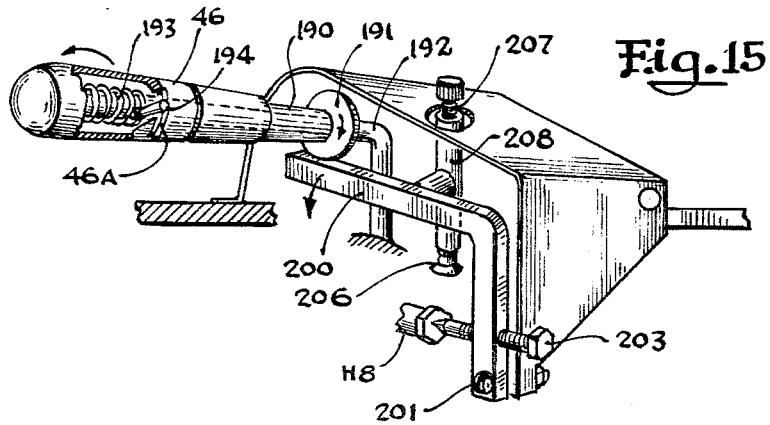
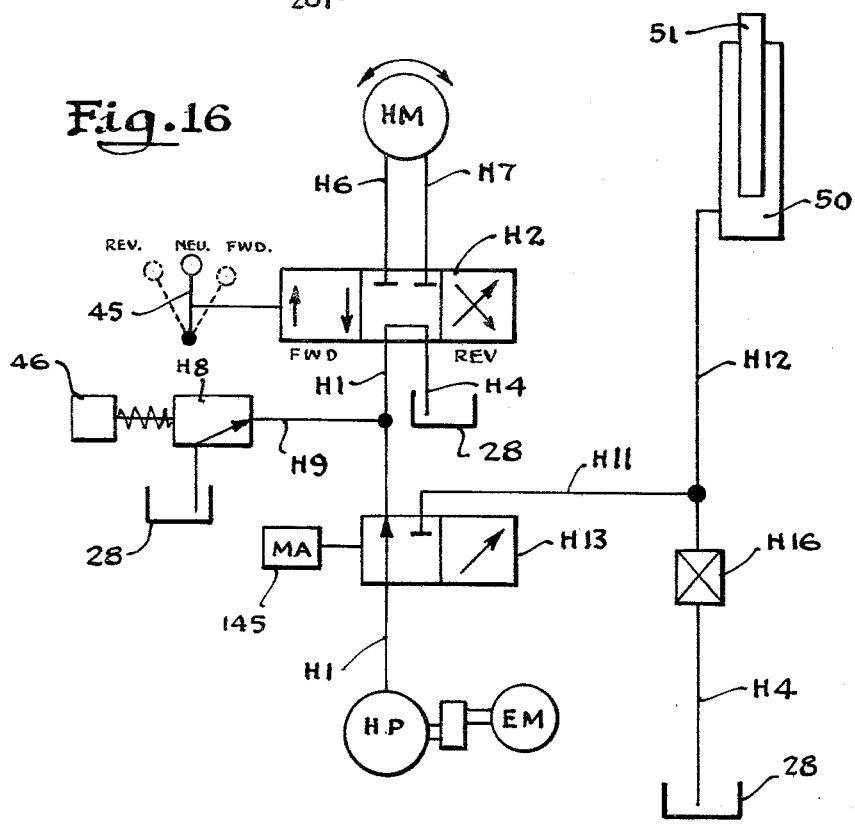
Inventor
Fred P. Hopfeld
By Wallace, Kinzer and Dorn
Attorneys

United States Patent Office 3,216,599
Patented Nov. 9, 1965

3,216,599
LIFT TRUCK WITH A DETACHABLE MAST ASSEMBLY, AND A PROPELLING AND ELEVATING CONTROL SYSTEM
Fred P. Hopfeld, Elmwood Park, Ill., assignor to Grand Specialties Company, Chicago, Ill., a corporation of Illinois
Filed Oct. 15, 1962, Ser. No. 230,333
4 Claims. (Cl. 214—672)

This invention relates to a lift truck, and in particular one constructed for quick maneuvering in narrow spaces.

Corridors, aisles and other narrow working spaces in warehouses and the like are frequently quite confining, and if it is desired to use a lift truck in these spaces the truck must be one which can be steered for turning virtually within the radius of the truck itself. Additionally, it frequently happens that one lift truck alone is not capable of universal work from the standpoint of the weight or the bulk of the goods to be handled, and variable heights to which the goods must be elevated present a similar problem. Working conditions such as these may necessitate a fleet of lift trucks, and the primary object of the present invention is to construct an easily steerable lift truck equipped with a lift mast that can be easily changed for one having different characteristics. Another and related object is to enable the mast to be easily tilted selectively at a desired working angle.

It has been observed that materials handling equipment of the kind here involved has not infrequently been carelessly parked such that the truck may be inadvertently started with no driver in control. Another object of the present invention is, therefore, to lessen the likelihood of such an occurrence by so arranging the drive for the driven wheels as to enable a sustained or continuous drive to be imparted thereto only by the operator continuing to hold disengaged a lock which in the disengaged or released position alone permits a sustained or continuous drive to be established.

In keeping with the countervailing safety aspect mentioned above, another object of the present invention is to prevent the lift plate from being raised when the vehicle is in motion.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a perspective view of a lift truck constructed in accordance with the present invention;

FIG. 2 is a fragmentary perspective view of the lift truck looking in at the driver's stand;

FIG. 3 is a perspective view of the lift truck directly at the back thereof;

FIG. 4 is a side elevational view of the lift truck;

FIG. 5 is a top plan view of the lift truck, partly in section;

FIG. 6 is a plan view of the steering ring;

FIG. 7 is an exploded side elevation of part of the steering mechanism;

FIG. 8 is a sectional view of the assembled steering mechanism;

FIG. 9 is a sectional view on the line 9—9 of FIG. 5 showing the manner in which the rear wheels are driven;

FIG. 10 is a fragmentary perspective view showing aspects of the release for the drive means;

FIGS. 11 and 12 are detail sectional views showing aspects of the aforesaid release;

FIG. 13 is an end view of the release bar;

FIGS. 14A, 14B and 14C are plan views showing various positions of the release bar;

FIG. 15 is a fragmentary perspective view of the speed control; and

FIG. 16 is a diagrammatic view of the hydraulic circuit.

The lift truck 20 of the present invention includes a frame 21 constructed to afford a support for a pair of front wheels 23 and a driven, steerable rear wheel 24. Intermediate the wheels 23 and 24, the frame 21 includes a bed 26 on which is supported a battery unit 27, FIG. 3, adapted to supply current to an electric motor EM for a purpose described hereinafter. The bed 26 also serves to support a hydraulic reservoir 28.

The frame 21 includes a pair of spaced bars 30 and 31, FIG. 3, which extend rearward of the bed 26. A horizontal support plate 33 extends between and is supported by the bars 30 and 31, and a pair of laterally spaced side plates 34 and 35, FIGS. 3 and 5, extend upward therefrom and define a relatively large housing in which is confined the driving and steering mechanism for the rear wheel and many of the hydraulic elements.

As shown in FIGS. 2 and 4, a control unit 40 having a top plate 41 supported at the upper ends of the side plates 34 and 35, and this unit locates conveniently for the operator many of the controls hereinafter described.

Referring again to FIGS. 2 and 4, a pedestal 42 is arranged between the aft ends of the support bars 30 and 31, and extends rearward therefrom an appreciable distance to afford a stand for the operator. It may be mentioned at this point that the operator is able to steer the rear wheel by means of a handle 44, FIG. 2, and is able to move the truck in a forward or reverse direction by a handle 45, while controlling the speed of the truck by means of a speed control handle 46.

The operator of the truck also has available at the control panel a crank 48, and this is adapted to shorten or lengthen an extensible element, as hereinafter described, incidental to positioning a mast 50, FIG. 4, relative to a vertical axis. The mast 50, as shown in FIG. 1, is in the form of an upright frame, and a hydraulic cylinder 51 is associated as a unit therewith. The cylinder 51 has a piston 52 operatively associated therewith, and the piston 52 is adapted to raise and lower a lift plate 54 guidably related to the mast 50. The mast 50 and its associated parts are detachably associated with the frame of the vehicle together with the front wheels as will now be described.

Incidental to detachably associating the front wheels and the mast with the frame of the truck, a pair of spaced arms 55, FIG. 5, are welded to the fore end of the battery support bed 26. These supports 55 are spaced sufficiently to neatly receive the mast 50 therebetween which, as shown in FIGS. 1 and 5, comprises a pair of upright angles 57 and 58 that are rigidly joined at their lower ends by a cross bar 60. The upper ends of the uprights 57 and 58 are joined by a cross plate 61, completing the frame that is the mast 50. The bottom cross bar 60 also serves as a support for the cylinder 51, and details of the cylinder and piston connections for the lift plate 54 will be described in detail hereinafter.

The axles for the front wheels 23 are in the form of individual relatively long detachable pins or rods 65 and 66, FIG. 5, and each such pin has a relatively large head 65H and 66H respectively adapted to fit flush against the outer hub of the related front wheels 23 as shown in FIGS. 1 and 5.

The detachable axle pins 65 and 66 are arranged to be passed through openings at the fore ends of the axle supports 55 as will be evident in FIG. 5. These pins also extend through apertures in the uprights 57 and 58 that are a part of the mast, and the inner ends of the pins 65 and 66 are tapered at 65T and 66T to fit in complemental tapered indentations at the base of the cylinder 51. The pins 65 and 66 after being related to the wheels, the mast and the cylinder as above described, are fixed against rotation by set screws 70 that are accessible at the upper surfaces of the wheel and mast supports 55.

As a consequence, the wheels 23 are free to turn on the portions of the pins 65 and 66 that are outward of the outer sides of the front wheel supports 55, and at the same time the mast and the associated cylinder are pivotally related as a unit to the pins 65 and 66 so as to be capable of being tilted in a desired vertical plane, about the pins 65 and 66 as an axis, as will be evident from the dotted line showings in FIG. 4.

It may be observed at this point that the mast 50 is stabilized in its operating plane by a tie link 72, FIG. 4, having the forward end thereof pivotally connected to a lug 73 at the back of the mast. The opposite end of the link 72 is pivotally connected to an extensible bar 75 that extends into a nut housing 76. The housing 76 is supported on the top plate 41 of the control unit or panel 40. The bar 75 is provided with a nut 78 arranged for sliding movement in the housing 76, and a screw 79, operated by the handle 48, is arranged to run the nut 78 fore or aft within the housing 76 in order to extend or retract the link 72 incidental to tilting the mast 50 at the desired angle.

The lift plate 54 is guided for vertical up and down movement at the front of the mast 50, and is equipped with a pair of replaceable fork arms 80 and 81. The lift plate 54 may as well be equipped with a pallet. Thus, as best shown in FIG. 4, the lift plate 54 includes at the sides thereof a pair of vertically extending guide plates 83 having at the lower ends thereof free wheeling rollers 84 on journal pins adapted to travel on the forward facing flanges 57A and 58A of the uprights 57 and 58. Lugs 86 are fixed to the upper ends of the guide plates 83, and rollers 87 are supported on journal pins at the free rear ends thereof to travel along the rear faces of the flanges 57A and 58A.

As noted above, the fork arms 80 and 81 are replaceable. The forks 80 and 81 are of L-shape configuration, and the vertical legs thereof are provided with socket tubes 90 and 91, FIG. 1, welded to the upper ends thereof. A cross support rod 92 is adapted to be fitted into the tubes 91 and 92. A plurality of lugs 95 are welded at spaced locations to the forward face of a cross plate 96 that is a part of the lift plate 54, and these lugs are likewise formed with apertures adapted to receive the cross rod 92.

In relating the forks 80 and 81 to the lift plate, forks of the appropriate kind are chosen, and the openings in the sleeves or supports 90 and 91 associated therewith are aligned with the openings in the lift plate lugs 95, whereafter the support rod 92 is passed through the registered openings and is secured against displacement by cotter pins, C-washers or the like at the outer ends thereof.

The piston 52 that is associated with the cylinder 51 is equipped at the upper end thereof with a cross head 100 serving as a support for a pin or axle on which a pair of sprockets 101 are journalled as shown in FIG. 1. A pair of chains 103 are trained around the sprockets 101, and the lower ends of the chains 103 are secured to lugs as 104, FIG. 4, in turn fixed to the lift plate 54. The opposite ends of the chains 103 are anchored to a cross plate 105 in turn fixed to the mast 50.

Assuming the piston 52 to be retracted, that is, at its lowermost position in the cylinder 51, raising of the piston, by delivering fluid under pressure to the cylinder 51, will be manifest in the lower ends of the chains 103 as viewed in FIG. 4 being raised, and resultantly the lift plate is raised. By bleeding the cylinder in a controlled fashion as hereinafter described, the lift plate can be lowered at a desired speed.

It will be seen from what has been described above that the mast 50 serves as a guide for the lift plate 54 adapted to travel up and down along the front face of the mast as a guide. The mast can be tilted at a selected position relative to a vertical plane by the operator turning the crank 48. The mast and the cylinder can be removed as a unit by loosening the set screws 70 and removing the pins 65 and 66. This may be necessitated by the need for a more powerful cylinder, or a higher mast. The chains 103 are easily substituted. In this connection, it may be noted that the nipple through which fluid under pressure is delivered to the base of the cylinder 51 is joined to the related supply conduit by a so-called quick disconnect coupling.

The rear wheel 24 is the driven wheel and also the one that is steered. The manner in which the rear wheel is supported and steered will first be described.

Thus, referring to FIGS. 5 through 9, the horizontal support plate 33 that is rigidly associated with the frame 21 in effect is the primary support for the rear wheel, although reactions are transmitted thereto through a relatively large stationary collar 110, FIG. 1. Thus, the support plate 33 is formed with a relatively large opening 33A, FIG. 8. The collar 110 has an annular horizontally oriented flange 110A bolted to the support plate 33, and a vertical sub sleeve 110B extends upward therefrom.

A steerable ring 115 is arranged above the collar 110, and this ring is adapted to be turned by a chain 116 in a manner described hereinafter.

The rear wheel 24 is supported on a driven axle 117 supported for rotation in bushings at the lower ends of a pair of spaced bars 118 and 119 that are secured at their upper ends to the underside of the steering ring 115. Thus, by turning the ring 115, the rear wheel 24 can be steered.

The ring 115 is held centered with respect to the collar 110 by rollers, and other rollers associated therewith serve to afford an anti-friction bearing support for the ring 115 in cooperation with the collar 110. Thus, as shown in FIG. 8, a plurality of rollers 120 are journalled for rotation, at the underside of the ring 115, on vertically oriented pins 121 which are arranged in symmetrically spaced relationship around the ring 115. The rollers 120 are disposed in position to track around the inner periphery of the sleeve 110B that is a part of the collar 110, and in this manner the ring 115 is centered for rotation about the axis of the collar 110.

The chain 116 is secured to the periphery of the ring 115 and held in place by retainers 122 in the manner illustrated in FIG. 5. This chain additionally is trained around a steering sprocket 131 secured to a vertically extending steering shaft 132. The steering shaft 132 at the lower end, FIG. 8, is supported for rotation in a thrust washer 135 in turn secured to the base plate 33. The shaft 132, FIG. 3, extends upwardly along the inside of the side plate 35, and the upper portion thereof is supported in an arm 136 at the right-hand end of the control unit 40. The steering handle 44 is secured to the upper end of the steering shaft 132, such that by turning the handle 44 in one direction or another the chain 116 is turned appropriately to impart the desired steering motion to the ring 115.

It was mentioned above that the axle 117 is a driven axle. To this end, the axle 117 is provided with a sprocket 140, FIG. 9, around which is trained a driven chain 142 in turn driven by a sprocket 143. The sprocket 143 is on the drive shaft of a hydraulic motor HM supported on the top side of the ring 115 to rotate therewith when steered. The hydraulic motor in turn receives fluid under pressure for either forward or reverse drive from a pump HP, and the pump HP is operated by the electic motor EM. Before explaining in detail the manner in which the truck is controlled for forward and reverse speeds, preliminary consideration will be given to the nature of the hydraulic circuit and related elements.

When the electric motor EM is energized in a manner explained hereinafter, the pump HP, FIG. 16, is set in operation and supplies fluid under pressure to a conduit H1. The conduit H1 leads to a four-way, three position directional valve, FIGS. 12 and 16, operated by the handle 45 referred to above. This valve is normally in a neutral position to disable any drive from being imparted to the motor HM, even though the pump is energized, and when the lift truck is idle this neutral or drive disabling position is a positively held position as will be explained hereinafter.

Thus, with the control valve H2 in its neutral position, motivating fluid is prevented from being directed to the hydraulic motor HM. In other words, the pump merely idles and no fluid under pressure is directed to the hydraulic motor, this circumstance being manifest in fluid under pressure, FIG. 16, being by-passed through valve H2 to a return line H4 that leads to the hydraulic reservoir or tank 28. In this circumstance, motor HM acts as a brake.

It may here be noted that the positions of the valve H2, on either side of the neutral position, are positions for imparting a forward or reverse drive to the motor HM as represented by legends in FIGS. 12 and 16. When the valve H2 is freed or released for displacement, the control spool thereof can be shoved to the left by the handle 45 as viewed in FIG. 12 connecting conduit H1 to conduit H6 which leads to the motor HM causing the motor to turn the shaft which carries the sprocket 143 in what constitutes a forward drive direction. In like manner, when the handle 45 is pulled to the right or clockwise as viewed in FIG. 12, valve H2 is positioned so that fluid under pressure in conduit H1 is directed to the motor through conduit H7, establishing an opposite direction of rotation for the shaft which carries the drive sprocket 143.

The speed with which the hydraulic motor is driven is under control of a needle valve H8. The needle valve is interposed in a by-pass conduit H9 which connects conduit H1 to the reservoir 28. Normally the needle valve H8 is wide open so that even though the drive disabling valve H2 has been moved to a released position, permitting the delivery of fluid under pressure to the motor HM, the fluid in conduit H1 is by-passed through the wide open needle valve to the reservoir 28. Therefore, by closing the needle valve H8, a maximum speed can be achieved, and speed variance is controlled by the handle 46 which positions the needle valve as hereinafter described.

Fluid under pressure is adapted to be directed to the cylinder 50 through conduits H11 and H12 as shown in FIG. 16. Thus, conduit H12 leads from the bottom of the cylinder 51 and is the conduit referred to above coupled to the cylinder 51 by way of a quick disconnect coupling. The conduit H12 is connected to the conduit H11 which in turn is connected to a control valve H13 which is interposed between conduits H1 and H11. The valve H13 is manually operated by way of a knob 145, FIG. 3. It may here be noted that the valve control knob 145 normally positions the valve H13 in the position shown in FIG. 15 where fluid is free to flow through conduit H1 toward the motor HM but is prevented from entering conduit H11 that leads to the cylinder 51. In other words, with valve H13 in its normal position, the vehicle can be driven, but the piston cannot be raised. To raise the piston, knob 145 is pulled "out," and fluid is then by-passed to conduit H11 entirely. Thus, the vehicle is stopped when the piston 52 is to be raised.

However, the piston 52 can be lowered at any time by draining the cylinder 50, and for this purpose a down valve H16 of the bleeder type is afforded as shown in FIG. 16, connecting the cylinder to the reservoir. The valve H16 is operated by a control knob 146, FIG. 3.

As noted above, the valve H2 in its neutral position is effective to disable the delivery of fluid under pressure to the hydraulic motor HM. When the lift truck is standing idle, this is the normal or fail-safe condition due to the spool of the valve being held against movement to a released or active position. Referring to FIG. 12, the spool of the valve H2 includes an extension 150, and a block 151 is secured to the forwardmost or left-hand end thereof as viewed in FIG. 12. A bar 152 is secured to the block 151 to be shifted with the valve spool by the control handle 45 when such movement is permitted, and this plate extends at right angles to the axis of the valve H2 at what amounts to the fore end of the control box of panel 40, FIG. 10.

Three pins 155, 156 and 157 are secured to the upper side of the bar 152, and these pins have flat upper ends in a common plane engaging the underside of the top plate 41 of the control box 40 so as to maintain the plate 152 on an even keel during fore or aft movement thereof.

The middle pin 155, FIGS. 14A and 14B, is normally embraced by the apex of a V-shaped cam 160, thereby preventing fore and aft movement of the handle 45. The cam 160 is affixed to a laterally movable release rod 161 having the opposite end portions thereof supported in a pair of guide lugs 163 and 164, FIG. 11, secured to the underside of the top plate 41. An adjustable stop 165 is secured to the rod 161 by a set screw 165S, and a coil spring 168 is arranged concentrically on the rod 161 between the lug 163 and the adjustable stop 165.

The spring 168 is normally effective to hold the cam 160 tight against the pin 155, and the cam 160 is so configured, in cooperation with the pin 155, to force the valve spool link 150 to what represents the neutral or drive disabling position of the valve H2. In other words, the spring 168 acting on the cam 160, and the latter on the pin 155, normally biases the valve H2 in its neutral, motor disabling position. Therefore, until the cam 160 is moved from its normal idle position to a released position, to release the pin 155 and its support, it is impossible to drive the truck either in a forward or reverse direction.

Manually operable means are afforded for releasing the cam 160 by releasing the rod 161 against the bias of the spring 168, enabling the valve H2 to be positioned manually for inducing forward or reverse movement of the truck. In the present instance, such manually operable means includes a pedal 170, FIG. 2, normally held in the raised idle position shown in FIG. 2 by the coil spring 168, and when the pedal is depressed the cam releasing rod 161 is shifted to the left as viewed in FIG. 11 to free the pin 155.

Thus, a cable 171, FIGS. 2, 3 and 11, is fastened to a lug 172 that is affixed to the rod 161. The cable 171, FIGS. 2 and 3, is trained around an idler pulley 173, and the end of the cable 171 opposite the lug 172 is connected to a triangular plate 175 which is pivotally supported by a pin 176 projecting inward from the side plate 35. An adjustable flexible connector including a turnbuckle 180 is secured to the free point of the plate 175, and in turn is connected to a hook at one end of a link 181 having a hook at the opposite end thereof connected to the foot pedal 170 as shown in FIG. 2.

It will be observed in FIG. 2 that the plate 175 is formed on the two legs adjacent the pin 176 with a plurality of apertures 175A for purposes of adjustment.

By depressing the pedal 170, the rod 161, as noted above, is shifted laterally against the bias or return action of the spring 168, and as a consequence the cam 160 is released relative to the pin 155, the parts then occupying the position illustrated in FIG. 14C. Under this circumstance, the spool of the valve H2 can be positioned by the handle 45 for either a forward or reverse drive. It will be realized that with the handle 45 released and the pressure of the foot of the operator removed from the pedal 170 in the idle position of the truck, the spring 168 is permitted to expand, and resultantly the cam 160 will cam the pin 155 to what corresponds to the neutral or drive disabling position of the valve H2 preventing accidental starting of the vehicle by inadvertent movement of the handle 45.

The speed of the truck as noted above, is under control of a needle valve H8, and the position of the needle valve H8, FIG. 15, is indirectly controlled by the handle 46 which is of a rotatable nature.

Thus, as shown in FIG. 15, the handle 46 includes a sleeve-like extension 190. A cam in the form of an eccentric 191 is secured to the handle extension 190. The handle 46 concentrically surrounds a support rod 192 having a torsion spring 193 associated therewith. The torsion spring is provided at the windable end thereof with a pin 194 disposed in a slot 46A in the handle 46 such that the handle 46 is turned against the bias of the spring 193 which will return the handle to a motor idle position when tension on the handle 46 is released.

The cam 191 bears on one end of an L-shaped lever 200 having the opposite end thereof supported pivotally on a stud 201. An adjustable screw 203 is mounted in the lever 200 in position to bear against the head of the needle valve H8, and as noted above, the needle valve H8 is normally in a wide open position characteristic of the handle 46 being held in a motor idle position by the spring 193.

By rotating the handle 46 clockwise a greater increment as viewed in FIG. 15, the end of the screw 203 is effective on the head of the needle valve to close the needle valve to a greater increment establishing a faster drive.

It may be finally observed that the electric motor EM is conditioned to be energized by turning a key-operated start switch 205, FIG. 3. The electric motor is energized through a start solenoid (not shown) energized by a switch 206, FIG. 15. The switch 206 is operated by an adjustable screw 207 carried in a sleeve 208 affixed to the speed control lever 200.

The present invention, it will be seen, makes possible a lift truck that is easily steered through the rear wheel, and since this is a single wheel the turning radius can be quite small. The rear wheel is advantageously driven by a hydraulic motor capable of delivering a variable speed both in a forward and reverse direction. Thus, the hydraulic system necessarily required for the lift cylinder 51 also supplies the motivating power for propelling the truck, and in this connection it may be recapitulated that the valve H16 prevents the piston 52 from being raised when the car is in motion. An additional safety feature is that when the truck is standing idle, the valve H2 is held in neutral position, disabling the delivery of power to the drive motor.

The mast 50 can be swung about the axle support pins 65 and 66 as an axis, merely by manipulating the crank 48, making it possible to dispose the load on the forks at an advantageous angle. The mast 50 and cylinder 51 can be detached as a unit, and another and different mast and cylinder unit substituted merely by withdrawing the pins 65 and 66 after loosening the set screws 70. Hence, while I have illustrated and described a preferred embodiment of my invention it is to be understood that this is capable of variation and modification, and I therefore do not wish to be limited to the precise details set forth, but desire to avail myself of such changes and alterations as fall within the purview of the following claims.

I claim:

1. In a wheeled lift truck, a frame including a pair of forwardly projecting laterally spaced front wheel supports, a vertically movable lift plate, an upright mast serving as a guide for a vertically movable lift plate, an hydraulic cylinder with indented portions carried by the mast as a unit therewith and having a piston adapted to raise and lower the lift plate, said mast and cylinder being located between said front wheel supports, individual front wheel axles supported and engageable with said indented portions detachably in said supports, said axles having inner ends pivotally supporting said mast and cylinder unit, and means stabilizing said mast.

2. A truck according to claim 1 wherein the stabilizing means is adjustable to enable the plane of the mast to be varied.

3. In a wheeled lift truck having a frame and including a support for front wheels and a support for a steerable rear wheel, an upright mast serving as a guide for a vertically movable lift plate, a vertically movable lift plate, an hydraulic cylinder having a piston adapted to raise and lower the lift plate and secured as a unit to the mast, means detachably securing said unit to the frame of the vehicle for pivotal movement to a selected position relative to a vertical plane, means for steering the rear wheel of the truck, hydraulic means for driving the rear wheel in a forward or reverse direction and including a hydraulic motor, first valve means normally in a neutral position disabling the delivery of fluid under pressure to said motor and adapted when displaced from neutral position to a released position to enable fluid under pressure to be delivered to said motor, second valve means in series with said first valve means to control the rate of fluid being delivered to said hydraulic motor and a two position pedal normally in an idle position effective to hold said first valve means in neutral position and adapted when held by the operator in a released position to permit said first valve means to be displaced as aforesaid, and third valve means in series with said first valve means, said third valve means operable to a position for directing fluid to said hydraulic motor and for blocking fluid under pressure to said piston for preventing the piston from being raised if the truck is in motion.

4. In a wheeled lift truck having front wheels, a steerable rear wheel, a frame and including a support for said front wheels and a support for said steerable rear wheel, a vertically movable lift plate, an upright mast serving as a guide for said vertically movable lift plate, a hydraulic cylinder having a piston adapted to raise and lower the lift plate, means for steering the rear wheel of the truck, drive means adapted when energized to propel said rear wheel, a multi-position drive disabling means normally in a neutral position preventing the transmission of a drive to said rear wheel and adapted when displaced from a first position to a second position to enable said rear wheel to be driven, a two-position, spring biased, mechanically operated control means normally effective in the first position to hold the drive disabling means in a second position and adapted when actuated to a second position by the operator to permit the drive disabling means to be displaced to aforesaid positions, said drive disabling means having extension means engageable with additional control means, said additional control means comprising: a foot pedal, linkage means for connecting said foot pedal to said drive disabling means, at least a portion of said linkage being flexible means, and angularly-shaped cam means adjacent one end of said linkage means and adapted to engage said extension means.

References Cited by the Examiner

UNITED STATES PATENTS

| | | | |
|---|---|---|---|
| 1,432,299 | 10/22 | Pleines | 187—9 |
| 1,831,405 | 11/31 | Bacon. | |
| 2,178,367 | 10/39 | Dunham | 214—672 |
| 2,178,370 | 10/39 | Dunham | 214—673 |
| 2,266,348 | 12/41 | Weiss | 214—672 |
| 2,284,237 | 5/42 | Stevenson | 214—671 |
| 2,320,601 | 6/43 | Howell | 214—674 |

(Other references on following page)

UNITED STATES PATENTS

| | | | |
|---|---|---|---|
| 2,337,109 | 12/43 | Johnson | 214—672 |
| 2,339,020 | 1/44 | Le Tourneau | 214—672 |
| 2,349,352 | 5/44 | Johnson | 214—674 |
| 2,504,885 | 4/50 | Schreck | 187—9 |
| 2,532,717 | 12/50 | Hawkins | 214—672 |
| 2,618,396 | 11/52 | Belt | 214—671 |
| 2,789,648 | 4/57 | Huffman | 180—66 |
| 2,799,417 | 7/57 | Morrell | 214—654 |
| 2,874,860 | 2/59 | King | 214—672 |
| 2,899,093 | 4/59 | Morrell | 187—9 |

HUGO O. SCHULZ, *Primary Examiner.*

MORRIS TEMIN, *Examiner.*